United States Patent
Fralick et al.

(10) Patent No.: US 12,008,588 B2
(45) Date of Patent: Jun. 11, 2024

(54) DATA INTEGRATION HUB

(71) Applicant: Poarch Band of Creek Indians, Atmore, AL (US)

(72) Inventors: Candy Kirby Fralick, Atmore, AL (US); James Dorris, Spanish Fort, AL (US); Ronald Nesbitt, Hoover, AL (US); John Enriquez, Spanish Fort, AL (US)

(73) Assignee: Poarch Band of Creek Indians, Atmore, AL (US)

( * ) Notice: Subject to any disclaimer, the term of this patent is extended or adjusted under 35 U.S.C. 154(b) by 0 days.

(21) Appl. No.: 17/450,814

(22) Filed: Oct. 13, 2021

(65) Prior Publication Data

US 2022/0036382 A1 Feb. 3, 2022

Related U.S. Application Data

(63) Continuation of application No. 15/098,920, filed on Apr. 14, 2016, now Pat. No. 11,157,921.

(60) Provisional application No. 62/149,223, filed on Apr. 17, 2015.

(51) Int. Cl.
*G06Q 30/02* (2023.01)
*G06Q 10/067* (2023.01)
*G06Q 30/0201* (2023.01)

(52) U.S. Cl.
CPC ....... *G06Q 30/0201* (2013.01); *G06Q 10/067* (2013.01)

(58) Field of Classification Search
None
See application file for complete search history.

(56) References Cited

U.S. PATENT DOCUMENTS

| 6,691,116 | B1* | 2/2004 | Bart ................. G06F 16/24 707/999.102 |
| 2006/0240891 | A1 | 10/2006 | Klinkhammer et al. |
| 2008/0147707 | A1* | 6/2008 | Jin ............. G06F 16/24537 707/999.102 |
| 2010/0114665 | A1* | 5/2010 | Stengard ............ G06F 16/902 715/764 |
| 2010/0211934 | A1 | 8/2010 | Simons et al. |

(Continued)

*Primary Examiner* — Alan Torrico-Lopez
(74) *Attorney, Agent, or Firm* — Finnegan, Henderson, Farabow, Garrett & Dunner, LLP

(57) ABSTRACT

A data integration hub system includes a centralized database storing data according to a dimensional modeling schema. The data integration hub system accepts an external dataset from an external data source that stores data according to a database schema that differs from the dimensional modeling schema of the central database. The data integration hub translates the external data set into a first importable format compatible with the dimensional modeling scheme of the centralized database, and imports the translated external dataset into the centralized database. The data integration hub also accepts online platform data from an online platform and imports the online platform data into the centralized database. In some cases, the data integration hub translated the online platform data prior to importation. The data integration hub generates client valuation profiles based on the data imported from the external data source and the online platform.

16 Claims, 4 Drawing Sheets

(56) References Cited

U.S. PATENT DOCUMENTS

2015/0220572 A1* 8/2015 Svarovsky ............ G06F 16/242
                                                                                       707/603

* cited by examiner

DATA INTEGRATION HUB

CROSS-REFERENCE TO RELATED APPLICATIONS

This application is a continuation of U.S. application Ser. No. 15/098,920 (now allowed), filed Apr. 14, 2016, which claims the benefit of priority to U.S. Provisional Application No. 62/149,223, filed Apr. 17, 2011 and titled "Data Integration Hub." Each of the foregoing applications is incorporated herein by reference in its entirety.

BACKGROUND

A client valuation profile can be used as the basis for marketing decisions. Traditionally, marketing efforts were based on a client's tier level. A client's tier level can be based on previous purchasing habits. For example, in a retail application, the tier level can be based on previous purchasing habits, such as annual spending at a particular store or group of stores. Additionally or alternatively, a client's tier level can be based on a combination of annual or lifetime spending, such as can be used by hotels or airlines who grant client's loyalty-based status. As another example, in a casino application, the client's tier level can be based on the client's average daily theoretical calculation ("ADT"). ADT is generally a valuation of the client, or the amount of money the casino expects to earn from that client for every visit to the casino. The ADT can be based on a number of factors, including how much money that the client is estimated to spend on a visit and how much money the casino earns from the client during a visit. Once an ADT is calculated, a tier level can be assigned to the client.

Traditionally, ADT was calculated using data obtained from data sources associated with a single institution, single group of institutions, or a single data platform. For example, ADT for a client of a casino could be determined based on the client's behavior or spending history at a particular brick and mortar casino. In another example, in the hospitality industry, ADT can be calculated based on when and where a client stays within a hotel network. Sharing data across multiple data platforms can be difficult due to differences between data platforms used by industrially related, but different, organizations. For example, traditionally, calculating ADT using data from a casino and a hotel could be difficult in situations where the casino and the hotel operate different inventory management or customer resource management systems.

SUMMARY

According to some embodiments, a data integration hub system includes a centralized database storing data according to a dimensional modeling schema. The data integration hub system accepts an external dataset from an external data source that stores data according to a database schema that differs from the dimensional modeling schema of the central database. The data integration hub translates the external data set into a first importable format compatible with the dimensional modeling schema of the centralized database, and imports the translated external dataset into the centralized database. The data integration hub also accepts online platform data from an online platform and imports the online platform data into the centralized database. In some cases, the data integration hub translates the online platform data prior to importation. The data integration hub generates client valuation profiles based on the data imported from the external data source and the online platform.

In some embodiments, the data integration hub system also generates a client list based on one or more client valuation profiles. The client valuations profiles can be based on the availability of promotional inventory and the content of the client valuation profile. The data integration hub system can also communicate the generated client list to a marketing platform.

According to some embodiments, a method for integrating data includes accepting an external dataset from an external data source, the external data source storing data according to an external database schema wherein the external database schema is different than a dimensional modeling schema of a centralized database. The method also includes translating the external dataset into a first importable format compatible with the dimensional modeling schema of the centralized database and importing the translated external dataset into the centralized database. The method also includes accepting online platform data from an online platform. When the online platform data is incompatible with the dimensional modeling schema, the method translates the online platform data into a second importable format compatible with the dimensional modeling schema of the centralized database and imports the translated online platform data into the centralized database. When the online platform data is compatible with the dimensional modeling schema, the method imports the accepted online platform data into the centralized database without translation. The method also generates a client valuation profile based on imported data from the external dataset and imported data from the online platform data.

In some embodiments, the method also generates a client list based on one or more client valuation profiles. The client valuations profiles can be based on the availability of promotional inventory and the content of the client valuation profile. The data integration hub system can also communicate the generated client list to a marketing platform.

BRIEF DESCRIPTION OF DRAWING(S)

Reference will now be made to the accompanying drawings which illustrate exemplary embodiments of the present disclosure and in which.

DETAILED DESCRIPTION

Figure 1:
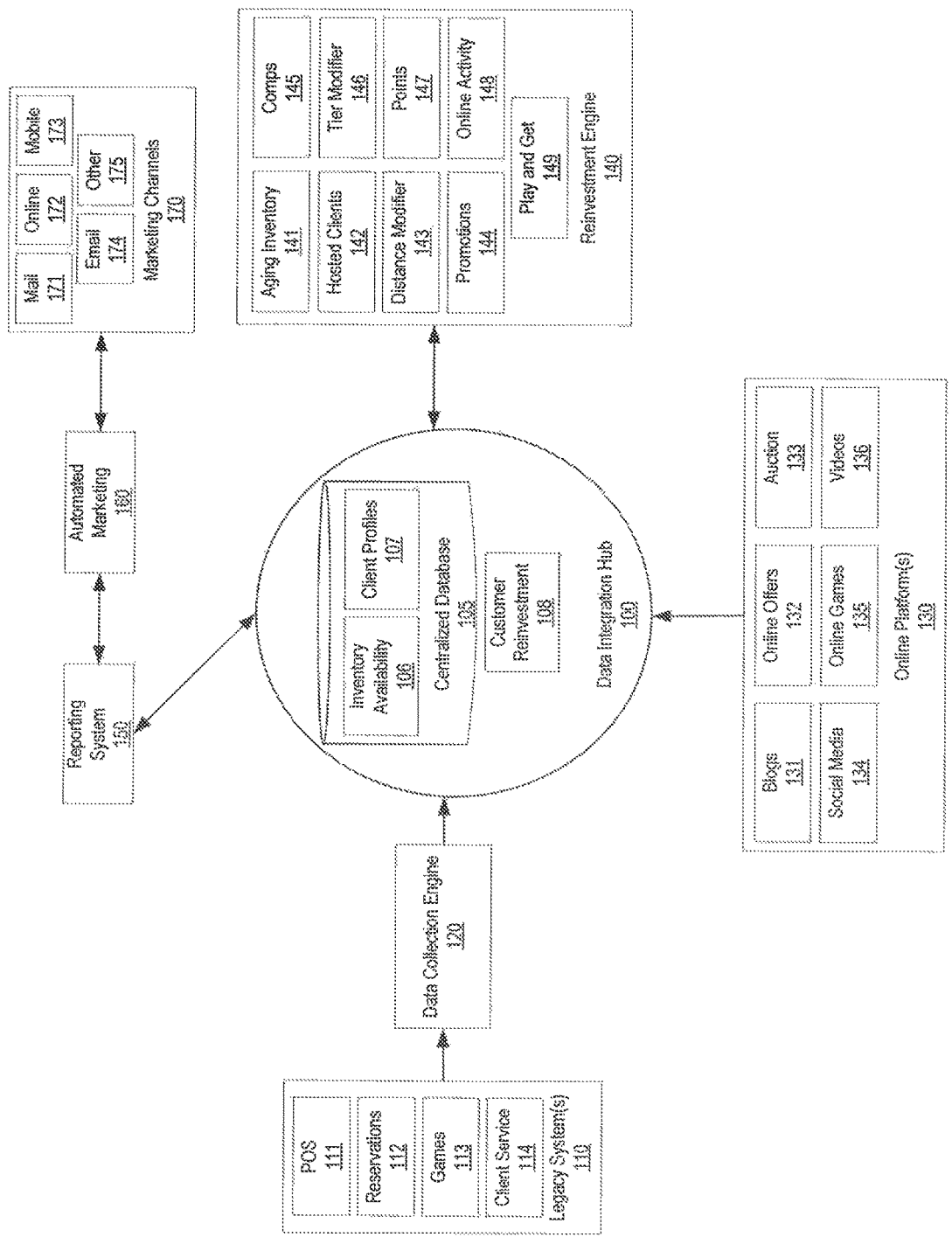
FIG. 1 illustrates, in block form, a network architecture for a distributed computing system including a data integration hub consistent with disclosed embodiments.

Reference will now be made in detail to exemplary embodiments of systems and methods for data integration, examples of which are illustrated in the accompanying drawings. Wherever possible, the same reference numbers will be used throughout the drawings to refer to the same or like parts. The terminology used in the description presented herein is not intended to be interpreted in any limited or restrictive manner simply because it is being utilized in conjunction with a detailed description of certain specific embodiments. Furthermore, the described embodiments may include several novel features, no single one of which is solely responsible for its desirable attributes or which is essential to the systems and methods described herein.

There is a need for more targeted, customized marketing approaches. Using a data integration hub, a business can use client data related to more than just the client's purchasing habits, purchasing history, or gaming history to make marketing decisions. This can improve the return on investment the business earns based on its marketing efforts. Further, it can help the business decide which marketing or promotions to grant to a particular client.

A data integration hub compiles and utilizes client information from a variety of sources. For example, this data may be collected from brick-and-mortar institutions (legacy systems), related websites, mobile applications, and social networking platforms (online platforms). This information may be provided to the data integration hub directly from the source. For example, servers associated with a website may send client information directly to the data integration hub. This may allow the data integration hub to receive this client data in real time. It may be preferable for certain sources to provide information to the data integration hub through indirect means. For example, in a casino application, if client information is collected at multiple games or machines in a casino, an intermediate engine can compile this information prior to sending it to the data integration hub. In retail or other applications, an intermediate engine may be used to compile client-specific information from a number of sources before this information is passed onto the data integration hub. Thus, the data may be provided to the data integration hub on a regular basis, such as daily, rather than in real-time.

This information may be compiled by the data integration hub to create a client valuation profile. Once this information is compiled, the reinvestment engines may use the client valuation profile to provide targeted marketing specifically catered to that client. For casinos, the client valuation profile may include, for example, a calculated average daily theoretic. In general, client valuation profiles may optionally include a client's purchasing history, an estimated client worth, an expected expenditure by the client, and/or a reinvestment value. The reinvestment value may include the amount of money budgeted to be spent on marketing to the client over a period of time, including promotions and discounts, and a current balance of that reinvestment, which may factor in the value of promotions that have already been redeemed.

The data underlying or included in the client valuation profile may relate to the client's interactions with the brick-and-mortar institution. The client valuation profile may analyze a client's behavior history to determine short-term and long-term habits of that customer to predict future behavior. For example, in the recreational industry, this may include requests by the client for reservations, such as restaurant reservations, hotel reservations, booking spa services, reservations for classes, and tickets for shows, including movie theatre and live performances. Additionally or alternatively, the data underlying the client valuation may include activities the client has participated in, including purchasing history, demographic attributes or geographic attributes. For example, in a casino application, this may include a client's gaming history at a casino.

A client's gaming history may be monitored or calculated in a number of different ways. At a simple level, the gaming history may include the frequency at which the client plays, or the amount of money the client spends on average. This data may be monitored on a daily, quarterly, and/or annual basis. Optionally, the client's gaming history may be more complex. This may include the client's preferences for certain games or certain types of games and win-loss information that may factor into a client's decision to continue playing that game, move to a different game, or stop playing altogether. The client's gaming may be analyzed to develop trends associated with the client's gaming history.

Similarly, a client's purchasing history may be monitored or calculated in a number of different ways. The purchasing history may include a record of all transactions between the client and the brick-and-mortar institution. It may also include the frequency at which the client conducts transactions with the institution and/or the amount of money the client spends over a certain period of time, on average, such as an average amount spent seasonally or annually, or an average transaction value.

In addition to client behavior at a brick-and-mortar institution, the data underlying the client valuation profile can include a client's online behavior. This may include information and activity related to a social networking platform, including the connections the client has and the client's self-professed interests, activities, and interactions with other users. Further, this data may include a client's actions on a website associated with the brick-and-mortar institution. For example, for a shopping institution, this may include the client's online purchase history. For services-related industries, such as the travel industry, it may include data related to the client's preference for booking travel plans through the website as opposed to other methods. It may also include the frequency at which the client visits the website and engages in a certain activity. For example, data related to an online gaming website may include the client's purchase history, gaming history, win rates, and preferences for playing certain types of games or at certain time periods. Similarly, the data may include a client's use of a mobile application.

A business may have multiple types of marketing and promotions. Marketing and promotions may include discounts and coupons, such as deals on accommodations, restaurants, and entertainment. For example, marketing may include a discount on hotel reservations or a free upgrade. Restaurant deals may include two-for-one deals on buffets or a free appetizer with purchase of a meal. Entertainment-based marketing may include game credits, including cash credits to be used in the casino, free concert or movie tickets, or discounts on other entertainment, like golfing, cooking classes, or other sports and recreational activities. Marketing in the retail industry may include coupons or exclusive deals, such as friends and family sales.

Optionally, the client valuation profile may indicate the client's preferences for certain promotions. This data may be based on the frequency and type of promotions that the client has historically redeemed or not redeemed. Additionally or alternatively, demographic information of the client may indicate a client's promotional preferences. For example, if the client lives close to the business, the client valuation profile may indicate that hotel deals may be less desirable for that client. At the same time, for clients that reside near the business, the preferences may indicate that the client would be more likely to redeem a same-day promotion, such as a discount on a meal later that day.

The data integration hub may optionally include information related to inventory availability. This inventory availability may monitor such inventory as available reservations, tickets, goods, and/or services. This inventory may track, for example, reservations, attendance at a buffet, the number of tickets sold, the number of tickets remaining, and the capacity of the casino floor. Optionally, the inventory may track the number of promotions already offered and/or redeemed for each category of marketing and promotions. This inventory may be used as part of a one-to-one marketing scheme based on the client's valuation profile.

Additionally or alternatively, the data integration hub may consider aging inventory in determining which inventory to use as a promotional marketing tool. This aging inventory can include promotions that the company will no longer have after a certain period of time. This may include, for example, a hotel room on a given night that has not yet been reserved. If a client does not reserve that room, then for that night the business may make no profit on the hotel room. Aging inventory may also include inventory that only has a seasonal appeal, including holiday-related goods or services. For example, in December, a retail institution may consider a portion of its Christmas decoration inventory as an aging inventory and leverage these products to entice clients to make other purchases. The data integration hub may prioritize such inventory to be used as a promotion for one-to-one marketing.

The client's valuation profile may include data related to a client's reinvestment value and current reinvestment balance. A client's reinvestment value may be a budget that the company is willing to spend on marketing to that client. This marketing budget may be limited to one-to-one marketing, or it may include a portion of the cost of less targeted marketing. For example, the cost of billboards in a certain location may be derived from reinvestment balances for clients that live close to that billboard. For some promotions, it may cost the company less than the value of the promotion to the client. For example, the cost to the company of a buffet for one person is likely lower than the value a client would pay for the buffet. The budget may be directed to the total desirable cost of marketing to that individual, including the cost to the company of certain promotions (e.g., the company's cost for providing a restaurant discount or a company's cost for providing a discount on certain goods) or the value to the client (e.g., the value of the discount). The client's reinvestment balance may be the current value remaining in their one-to-one marketing budget. This current balance may consider the value of outstanding promotions (e.g., those promotions that are still redeemable or not yet expired that have not been redeemed). Or, the current balance may consider only those promotions that have been redeemed. For example, if the client's reinvestment balance would allow the client to receive a certain promotion, the data integration hub may indicate that the certain promotion be provided to the client.

The data integration hub may communicate data to a reinvestment engine, such as a points manager. The points manager may calculate the number of rewards or points that a client has accrued or earned from play at the brick-and-mortar casino. For example, data stored in the client valuation profile related to their gaming history at the brick-and-mortar and/or online casinos may be used to calculate points earned by the client. These points may be redeemable for certain rewards, such as free play, restaurant discounts, tickets, and/or lodging. Additionally or alternatively, the points manager may calculate the number of points a client has accrued or earned from online play. These points may be treated differently or the same as points earned at the brick-and-mortar institution. The points manager may send the calculated points information to the data integration hub, which may incorporate this information into a client's valuation profile. The points earned from online play may be exchanged for rewards, including food credits, hotel discounts, and spa promotionals. Additionally or alternatively, the points may be used as a monetary equivalent to bet on items in an auction.

Similarly, in retail or other applications, the points manager may calculate the number of rewards or points that a client has accrued from its transactions with the company. For example, points may be accrued based on the number of transactions or value of the transactions between the client and the company. These points may expire after a certain time. The points manager may monitor the points value for a certain client and send this information to the data integration hub, which may incorporate this information into a client's valuation profile. These points may be exchanged for rewards by the client.

Additionally or alternatively, the data integration hub may communicate with an automated marketing platform. This communication may occur through list generation where the data integration hub sends a batch of clients and client offers to the automated marketing platform on a periodic basis. This communication may also occur in real-time where the data integration hub sends an offer to a single client or a group of clients. The automated marketing platform may use data related to promotional inventory, client reinvestment balance, and client valuation profiles to select and send promotions to the client. The automated marketing platform may select which medium to communicate promotions to the client. For example, for aging inventory, the automated marketing platform may utilize more immediate means of communication the promotion, such as text message or email. Additionally or alternatively, the automated marketing platform may select the communication method based on the client valuation profile. For example, the automated marketing platform may use the telephone to contact clients that do not have a mobile device or email address. Other forms of communication may include mailed offers and other traditional media.

The data in the data integration hub may be used to determine a marketing strategy. For example, based on the client valuation profile and the customer reinvestment balance, it may be desirable to offer a discount promotion to the client. The data regarding the client's preferences that is stored in the client valuation profile may be used to determine the type of promotion that may be desirable to the client. For example, for a client that regularly frequents the buffet when visiting the casino, it may be advantageous to offer the client a two-for-one discount on the buffet. The automated marketing platform may also use data in the client valuation profile to determine the best method of providing this offer to the client. For example, if previous experience indicates that the client is more likely to use an emailed offer and has never redeemed a mailed coupon, the automated marketing platform may send the two-for-one buffet coupon to the client's email address.

Turning now to FIG. 1, it illustrates a network architecture for a distributed computing system including a data integration hub consistent with disclosed embodiments. As shown in FIG. 1, data integration hub 100 communicates with one or more legacy system(s) 110, one or more online platform(s) 130, reinvestment engine 140, reporting system 150, and automated marketing platform 160. In some embodiments, data integration hub 100 can communicate with the system shown in FIG. 1 using one or more local or wide area network connections, or one or more packet based networks, such as the Internet. One of ordinary skill in the art would understand that the systems depicted in FIG. 1 can communicate using any networking protocol known in the art, using known techniques for communication between distributed computing systems, without departing from the spirit and scope of the embodiments disclosed herein.

According to some embodiments, data integration hub 100 includes centralized database 105. Centralized database 105 operates as efficient data store for data that has been accepted from one or more of the systems of FIG. 1, such as legacy system(s) 110, online platforms 103, and reinvestment engine 140. In some embodiments, centralized database 104 is configured using a dimensional modeling schema, which is described in more detail below with respect to FIG. 2. Centralized database 105 can store data related to inventory availability 106 and client profiles 107.

Inventory availability 106 can include data received from reinvestment engine and can pertain to, in part, inventory that is available for marking or promotions. Unreserved hotel rooms at a casino or purchased seats at a musical performance are some non-exclusive examples of inventory available for marketing or promotions.

Client profiles 107, as described above, are profiles used to describe attributes of a client that can be used for marketing purposes. They can include, for example, the client's tier level, ADT, purchasing history, estimated net worth, reinvestment value, gaming history, reservation history, demographic attributes, or geographic attributes. The client valuation profile can also include information related to social media, such as the client's social media activity, social gaming history, or other analytical data extracted from a client's public facing social media.

In some embodiments, data integration hub 100 can also include customer reinvestment module 108. Customer reinvestment 108 is a module or component that performs operations to generate client lists based on data in centralized database 105. For example, customer reinvestment 108 can perform one or more queries of inventory availability 106 based on attributes of client profiles 107, or, vice versa—it can perform one or more queries of client profiles 107 based on attributes of inventory availability 106. Customer reinvestment 108, in some embodiments, is configured to generate client lists on a periodic basis. Or, customer reinvestment 108 can be configured to generate client lists based on a time event. For example, customer reinvestment can include one or more triggers or alerts that result in client list generation when inventory availability 106 has inventory that is about to expire. In addition, in some embodiments, customer reinvestment 108 may communicate with reinvestment engine 140 to identify potential marketing opportunities, as disclosed in more detail above.

Data integration hub 100 integrates data from multiple data sources, such as legacy system(s) 110, online platform(s) 130 and reinvestment engine 140. In some embodiments, the data sources for which it integrates data requires translation or configuration before it can be imported into centralized database 105. To accomplish this, data integration hub 100 can include or utilize one or more data collection engines 120. Data collection engine 120, according to some embodiments, performs the functions necessary to translate data from its original form into a form that can be imported into centralized database 105, which may use a dimensional modeling schema in some embodiments. For example, data collection engine 120 can include one or more scripts that parse incoming data, extract data from it, and generate an insert statement for adding data to centralized database 105. Use of data collection engine 120 may be especially advantageous when data integration hub 100 collects data from legacy system(s) 110 because legacy system(s) 110 will generally use database schemas optimized for the business (e.g., hotel reservation system) for which it was designed, whereas centralized database 105 uses a dimensional modeling schema which can be optimized for integration of multiple sources. In addition, data collection engine 120 may collect data in real time from legacy system(s) 110 and translate the data in batch before providing it to data integration hub 100. In some embodiments, data collection engine 120 can be configured to operate under an ETL (extract transform load) paradigm or another common data extraction and transformation.

Although FIG. 1 depicts one data collection engine 120 for use with legacy system(s), other data collection engines 120 are contemplated. For example, in some embodiments, data integration hub 100 can use a data collection engine 120 with online platforms) to translate data stored in a format optimized for online platforms. In addition, data integration hub 100 can use multiple data collection engines 120 for legacy system(s) 110 or online platform(s) 130. For example, data integration hub 100 can use a first data collection engine 120 with a hotel legacy system, and a second data collection engine for a casino/gaming legacy system, and a third data collection engine for social gaming platform. The number and variety of data collection engines may depend, in part, on the specific application and embodiment of data integration hub 100.

Legacy system(s) 110 can include, for example, computing systems related to brick-and-mortar business in the hospitality, retail, and gaming industries. The data stored by legacy system(s) 110 can be acquired by data integration hub 100 to generate client profiles 107. Legacy system(s) 110 may include, for example, one or more point of sale terminals 111, one or more reservation systems 112, one or more gaming management systems 113, or one or more client services 114. The contents of each of legacy system(s) 110 can vary from industry and embodiments.

Online platform(s) 130 can include, for example, computing platforms related to online or computerized business. The data stored and provided by online platform(s) 130 can be acquired by data integration hub for generating client profiles 107. Examples of online platforms can include eCommerce websites, social media websites, online gaming websites, video sharing websites, and the like. An online platform 130 can include blogs 131, online offers 132, auctions 133, social media 134, online games 135, and videos 136. The data and metadata associated with each of these components can be acquired from data integration hub 100 for generation of client profiles 107.

Reinvestment engine 140 can include one or more data structures, modules or components that can provide data to data integration hub 100 which it can use as inventory availability 106. For example, reinvestment engine 140 can include an aging inventory 141 module that provides data related to aging inventory, a promotions module 144 related to available promotions, and a comps module 145 related to available comps for certain clients. Reinvestment engine 140 can also include information regarding one or more hosted clients 142, i.e., clients that have received comps, promotions or other items in brick-and-mortar businesses. Hosted clients 142 can have one or more points balances maintained by points 147 module. In some embodiments, reinvestment engine 140 provides data regarding a customer's reinvestment value, which can be include in client profiles 107.

Data integration hub 100 can also interface with reporting system 150 and automated marketing platform 160 to initiate one or more marketing campaigns for attracting clients to a good, service, or experience. For example, data integration hub 100 can provide one or more client lists to reporting system 150 which can configure them for use by automated marketing platform 160. Automated marketing platform 160 can generate one or more marketing campaigns that can be deployed over one or more marketing channels 170. For example, automated marketing platform 160 can generate marketing campaigns for marketing via regular mail 171, online advertising 172, mobile device advertising 173 (e.g., text messages, calls), email 174, or other marketing channels 175 known in the art. In some embodiments, automated marketing platform 160 provides data regarding the results of the marketing campaign to reporting system 150, and reporting system 150 may format that data for consumption by data integration hub 100 (for example, by translation the data for import into centralized database 105). Marketing campaign results can be used to generate and/or modify client profiles 107.

While FIG. 1 depicts one or more components as external to data integration hub 100, in some embodiments, such components can be included as part of data integration hub 100, that is, data integration hub 100 should not be limited to the components and configuration disclosed in FIG. 1. For example, in some embodiments, any of data collection engine 120, reinvestment engine 140, reporting system 150 or automated marketing platform 160 can be part of data integration hub 100. The network architecture of the system of FIG. 1 is shown as just one example, should not limit the scope of the claims, and is presented to describe the function of one embodiment of data integration hub 100.

Figure 2:
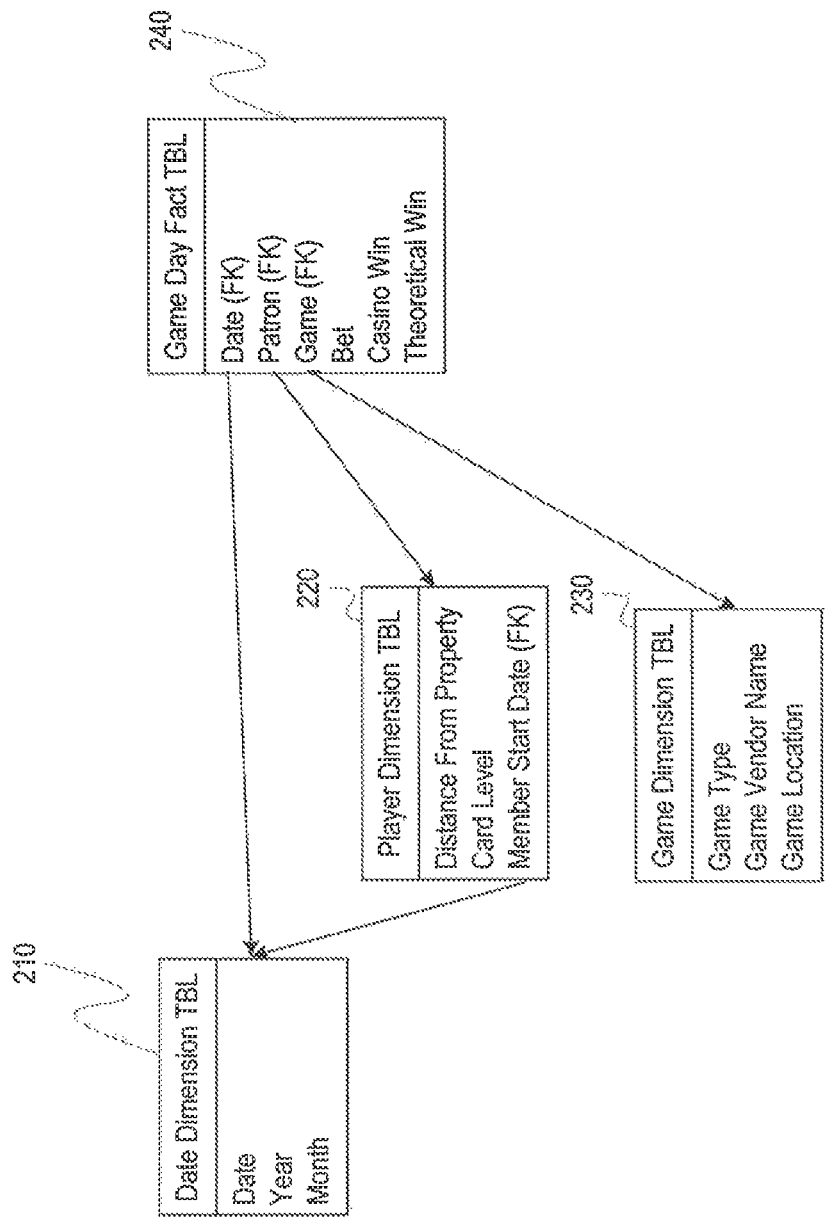
FIG. 2 illustrates, in block form, an example dimensional modeling schema consistent with disclosed embodiments.

FIG. 2 illustrates, in block form, an example of tables from a dimensional modeling schema that can be used by centralized database 105. According to some embodiments, a dimensional modeling schema includes two at least two types of tables, fact tables and dimension tables. Generally, fact tables hold data that can be analyzed and dimension tables contain information attributes that can be used for filtering, grouping, and sorting data. The example of FIG. 2 shows one fact table, Game Day Fact TBL 240, and three dimension tables Date Dimension TBL 210, Player Dimension TBL 220, and Game Dimension TBL 230. As shown in FIG. 2, a fact table can include one or more references to dimensions. For example, each row of the Game Day Fact TBL includes keys to rows in the Date Dimension TBL, the Player Dimension TBL, and the Game Dimension TBL.

In some embodiments, the dimensional modeling schema of centralized database 105 utilizes the concept of "grain" to abstract data. Grain can refer to the lowest level of data captured by a process. To implement grain in the dimensional modeling schema, each grain is mapped to a separate fact table, and fact tables contain information for one grain. In such embodiments, grain establishes the data stored in a row of a fact table. Grain declaration enforces consistent design in the schema as the grain is determined before choosing dimensions or facts. As a result, each fact or dimension related to a grain is consistent and the use of grain enforces a uniformity on the design of a dimensional modeling schema that is critical to application performance and ease of use.

According to some embodiments, the dimensions in a dimensional modeling schema provide the "who, what, where, when, why and how" context surrounding a process event. For example, FIG. 2 shows dimensions related to who (Player Dimension TBL 220), when (Date Dimension TBL 210), and what (Game Dimension TBL). Generally, dimension tables contain the descriptive attributes used by applications for filtering and grouping facts. In preferred embodiments, the relationship between a dimension and an associated fact row should be one-to-one. For example, as shown in FIG. 2, there is a one-to-one relationship between rows in the Game Day Fact TBL 240 and rows in Date Dimension TBL 210, Player Dimension TBL 220, and Game Dimension TBL 230, because each row of the Game Day Fact TBL 240 contains a key (FK) corresponding to a row in the dimension tables. Dimension tables can contain the entry points and descriptive attributes allowing business analysis. Dimension attributes can serve as the source of query constraints and report labels.

According to some embodiments, facts in a dimensional modeling schema are the measurements that result from a process event. In most cases, facts are numeric. A single fact table row has a one-to-one relationship to a measurement event as described by the fact table's grain. Typically, a fact table corresponds to a physical observable event, and not to a reporting need. As an example, the three common fact table types include transactions, period snapshots, and accumulating snapshots. Transaction fact tables typically correspond to a measurement event of a process. Periodic snapshot fact tables summarize many measurement events in a standard time frame. Accumulating snapshot fact tables summarize measurement events occurring at predictable or predetermined steps between the beginning and end of a process. Other types of fact tables include factless (records a set of dimensional entities coming together at a moment in time), aggregate fact tables (numeric rollups used to accelerate performance), and consolidated fact tables (combine events from more than one modeled process).

Using a dimensional modeling schema in centralized database 105 of data integration hub 100 increases performance. In most cases, fact tables will include two types of values: foreign keys to dimension tables and numeric values. Accordingly, processing of strings and character values, which can be more computationally expensive than processing numeric values, is kept to a minimum. Also, by modeling the data not by output (i.e., by report) but rather on grains corresponding to processes, redundant data is kept to a minimum, which can also increase performance.

Figure 3:
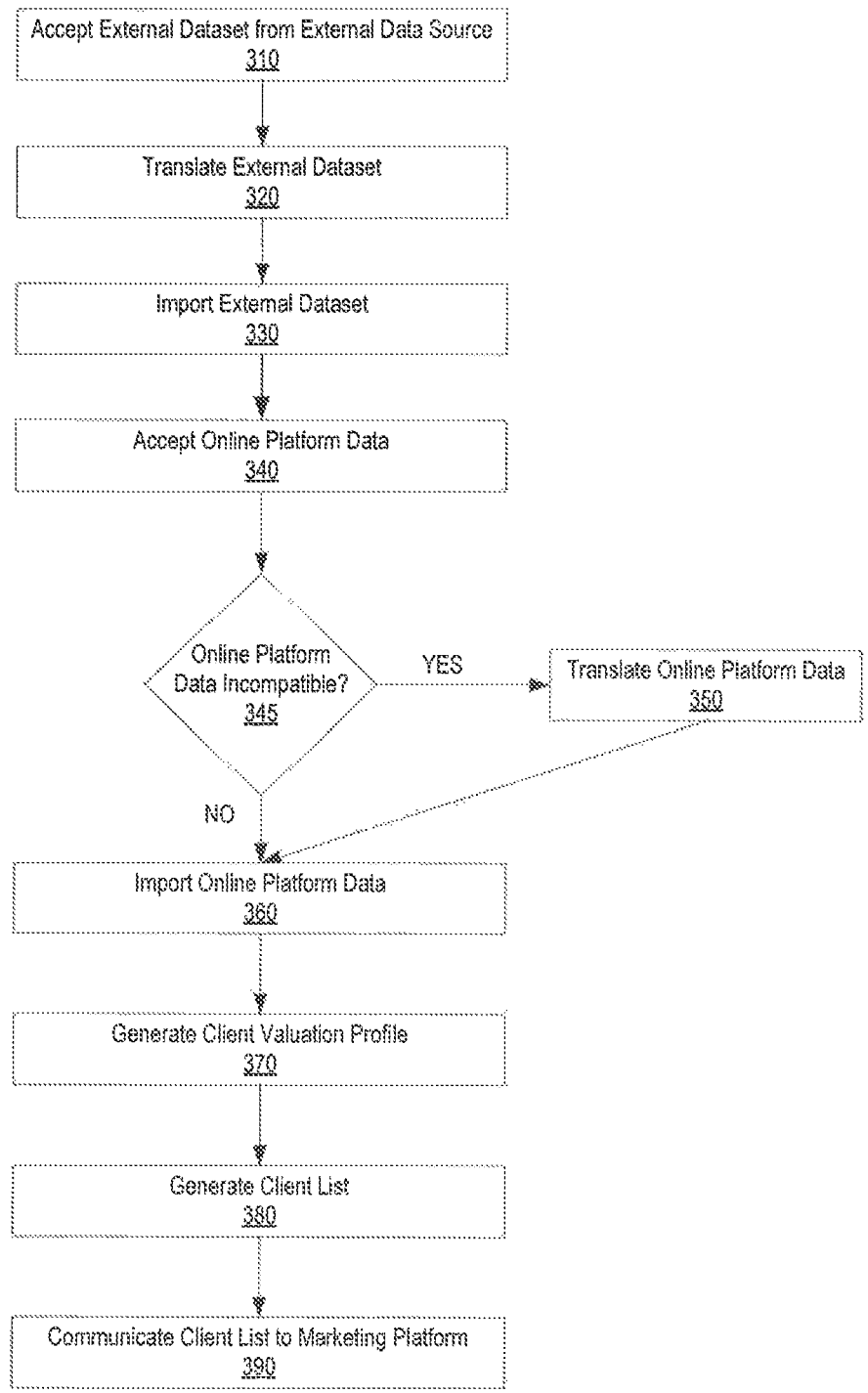
FIG. 3 is a flowchart representation of a data integration process consistent with the embodiments of the present disclosure.

FIG. 3 shows a flowchart of a data integration process 300 consistent with disclosed embodiments. According to some embodiments, one or more sub-processes of process 300 can be performed by data integration hub 100 by executing software instructions stored in one or more memory devices. Data integration process 300 can be executed by a data integration hub to accept external data from legacy system(s) 110 and/or online platform(s) 130. In some embodiments, data collection engine 120 performs one or more functions of data integration process 300. As disclosed above, in some embodiments, data integration hub 100 includes data collection engine 120 and can perform the steps of data integration process 300. While FIG. 3 illustrates data integration process 300 as occurring in a particular order, in some embodiments, the order of functions of data integration process 300 can occur in a different order. For example, data integration process 300 can perform functions 340, 350, and 360 before functions 310, 320, and 330 without departing from the spirit and scope of the embodiments disclosed herein.

Data integration process 300 starts at step 310, accept dataset from external data source. According to some embodiments, data integration hub obtains an external data from one or more legacy systems. The legacy systems can contain data related to sales, reservations (for hospitality systems), games (for gaming systems), or any other service provided to one or more clients or customers. The legacy systems can store the data according to different database schemas and different schemas than the dimensional database schema of data integration hub. Thus, in some embodiments, the data integration hub must translate the external dataset (at step 320) to its dimensional database schema. The translation can occur according to an ETL (extract, transform, load) process, or an extract, load, then transform. In such embodiments, step 320 can occur prior to step 310. Once the data integration hub translates the external data, the data integration hub imports the translated data into its centralized database (at step 330).

A data integration hub can also perform data integration process 300 to add data from online platforms to its central database. At step 340, the data integration hub accepts online platform data from one or more online platforms. It can accept the data in real-time, or in some cases, in batch. According to some embodiments, the data integration hub exposes one or more APIs for accepting data from an online platform. In other embodiments, the data integration hub can analyze public facing online platforms and accept data using data extraction technologies known in the art such as screen scraping.

In some cases, the online platform data may be in a format that is not immediately compatible with the dimensional database schema of the data integration hub. Accordingly, in some embodiments, data integration hub performs a check to see of the online platform data is a compatible format (at step 345). If it is (step 345: NO), then the data integration hub imports the online platform into its centralized database. If the online platform data is not in a compatible format (step 345: YES), then the data integration hub translates the online platform data into a format compatible with the data integration hub's central database dimensional database schema.

In some embodiments, both the dataset and the online platform data are translated using the same techniques, i.e., using the same translators. In other embodiments, the external dataset is translated using a first technique and the online platform data is translated according to second technique, if needed. In addition, in some embodiments, the data integration hub has, or used, one or more data collection engines. The data collection engines can include one or more data translators that are configured according to the data source for which they are translating data.

Once the data integration hub imports the translated external data and translated (if needed) online platform data, it can generate one or more client valuation profiles based on that data (at step 370). A client valuation profile can include, for example, the client's tier level, ADT, purchasing history, estimated net worth, reinvestment value, gaming history, reservation history, demographic attributes, or geographic attributes. The client valuation profile can also include information related to social media, such as the client's social media activity, social gaming history, or other analytical data extracted from a client's public facing social media. In some embodiments, the client valuation profile can include data obtained from one or more applications installed in the client's social media profile or account. For example, the client valuation profile can include the frequency of games played for a social gaming application.

The data integration hub can generate one or more client lists for marketing purposes (at step 380). According to some embodiments, the data integration hub can generate the client list for marketing based on attributes in the client valuation profiles and attributes related to available promotion inventory. For example, client valuation profiles that show frequent visits to hotels or casinos in a geographic regions may be matched with promotional inventory for the geographic region. Once the client list is generated, the data integration hub can communicate the client list to a reporting system and/or a marketing platform, which in turn generates promotional offers for one or more marketing channels.

Figure 4:
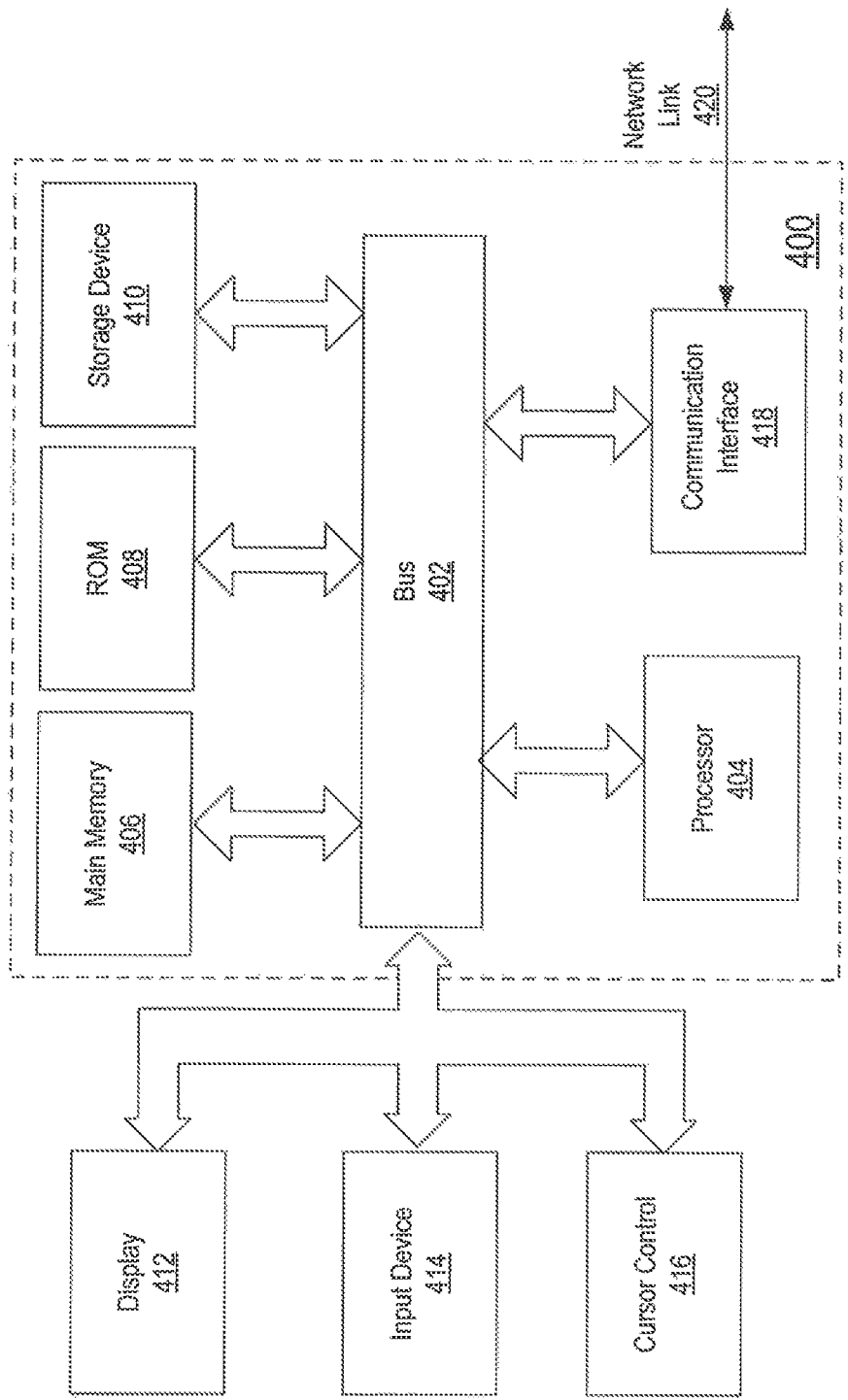
FIG. 4 illustrates, in block form, a computer system with which embodiments of the present disclosure can be implemented.

FIG. 4 is a block diagram of an exemplary computer system 400, consistent with embodiments of the present disclosure. The components of distributed system depicted in FIG. 1, such as data integration hub 100, legacy system(s) 110, online platform(s) 130, reinvestment engine 140, reporting system 150, and automated marketing platform 160, can include an architecture based on, or similar to, that of computer system 400.

As illustrated in FIG. 4, computer system 400 includes a bus 402 or other communication mechanism for communicating information, and hardware processor 404 coupled with bus 402 for processing information. Hardware processor 404 can be, for example, a general purpose microprocessor. Computer system 400 also includes a main memory 406, such as a random access memory (RAM) or other dynamic storage device, coupled to bus 402 for storing information and instructions to be executed by processor 404. Main memory 406 also can be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

In some embodiments, computer system 400 can be coupled via bus 402 to display 412, such as a cathode ray tube (CRT), liquid crystal display, or touch screen, for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. The input device typically has two degrees of freedom in two axes, a first axis (for example, x) and a second axis (for example, y), that allows the device to specify positions in a plane.

Computer system 400 can implement disclosed embodiments using customized hard-wired logic, one or more ASICs or FPGAs, firmware and/or program logic which in combination with the computer system causes or programs computer system 400 to be a special-purpose machine. According to some embodiments, the operations, functionalities, and techniques disclosed herein are performed by computer system 400 in response to processor 404 executing one or more sequences of one or more instructions contained in main memory 406. Such instructions can be read into main memory 406 from another storage medium, such as storage device 410. Execution of the sequences of instructions contained in main memory 406 causes processor 404 to perform process steps consistent with disclosed embodiments. In some embodiments, hard-wired circuitry can be used in place of or in combination with software instructions.

The term "storage media" can refer, but is not limited, to any non-transitory media that stores data and/or instructions that cause a machine to operate in a specific fashion. Such storage media can comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from, but can be used in conjunction with, transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infrared data communications.

Various forms of media can be involved in carrying one or more sequences of one or more instructions to processor 404 for execution. For example, the instructions can initially be carried on a magnetic disk or solid state drive of a remote computer. The remote computer can load the instructions into its dynamic memory and send the instructions over a network line communication line using a modem, for example. A modem local to computer system 400 can receive the data from the network communication line and can place the data on bus 402. Bus 402 carries the data to main memory 406, from which processor 404 retrieves and executes the instructions. The instructions received by main memory 406 can optionally be stored on storage device 410 either before or after execution by processor 404.

Computer system 400 also includes a communication interface 418 coupled to bus 402. Communication interface 418 provides a two-way data communication coupling to a network link 420 that is connected to a local network. For example, communication interface 418 can be an integrated services digital network (ISDN) card, cable modem, satellite modem, or a modem to provide a data communication connection to a corresponding type of telephone line. As another example, communication interface 418 can be a local area network (LAN) card to provide a data communication connection to a compatible LAN. Communication interface 418 can also use wireless links. In any such implementation, communication interface 418 sends and receives electrical, electromagnetic, or optical signals that carry digital data streams representing various types of information.

Network link 420 typically provides data communication through one or more networks to other data devices. For example, network link 420 can provide a connection through a local network to other computing devices connected to the local network or to an external network, such as the Internet or other Wide Area Network. These networks use electrical, electromagnetic, or optical signals that carry digital data streams. The signals through the various networks and the signals on network link 420, and through communication interface 418, which carry the digital data to and from computer system 400, are example forms of transmission media. Computer system 400 can send messages and receive data, including program code, through the network(s), network link 420 and communication interface 418. In the Internet example, a server (not shown) can transmit requested code for an application program through the Internet (or Wide Area Network), the local network, and communication interface 418. The received code can be executed by processor 404 as it is received, and/or stored in storage device 410, or other non-volatile storage for later execution.

In the foregoing disclosure, embodiments have been described with reference to numerous specific details that can vary from implementation to implementation. Certain adaptations and modifications of the embodiments described herein can be made. Therefore, the above embodiments are considered to be illustrative and not restrictive.

Furthermore, throughout this disclosure, several embodiments were described as containing modules and/or components. In general, the word module or component, as used herein, refers to logic embodied in hardware or firmware, or to a collection of software instructions, possibly having entry and exit points, written in a programming language, such as, for example, C, C++, or Java, or some other commonly used programming language. A software module may be compiled and linked into an executable program, installed in a dynamic link library, or may be written in an interpreted programming language such as, for example, BASIC, Perl, or Python. It will be appreciated that software modules can be callable from other modules or from themselves, and/or may be invoked in response to detected events or interrupts. Software modules can be stored in any type of computer-readable medium, such as a memory device random access, flash memory, and the like), an optical medium (e.g., a CD, DVD, BluRay, and the like), firmware (e.g., an EPROM), or any other storage medium. The software modules may be configured for execution by one or more processors in order to cause the marketplace computer system 110 to perform particular operations. It will be further appreciated that hardware modules can be comprised of connected logic units, such as gates and flip-flops, and/or can be comprised of programmable units, such as programmable gate arrays or processors. Generally, the modules described herein refer to logical modules that can be combined with other modules or divided into sub-modules despite their physical organization or storage.

What is claimed is:

1. A data integration hub system, comprising:
a centralized database including a plurality of fact tables with data related to observable events and a plurality of dimensional tables with attributes for the data contained in the fact tables;
at least one processor that is configured to execute a set of instructions to:
receive an external dataset from an external data source, the external data source storing data according to an external database schema;
translate the received external dataset into a first importable format compatible with the centralized database, wherein the external dataset is translated using one or more scripts that parse the external dataset, extract data from the parsed dataset, and generate one or more insert statements to add the extracted data to the centralized database;
import the extracted data into the centralized database using the one or more insert statements;
receive online platform data from an online platform, the online platform comprising a server associated with a website that sends the online platform data for storage in the centralized database;
translate the online platform data into a second importable format compatible with the centralized database; and
import the translated online platform data into the centralized database;

wherein the dimensional tables provide data identifying a context surrounding each observable event, the context including information relating to at least two of the following types: who is in the observable event, what is the observable event, where the observable event occurs, when the observable event occurs, why the observable event occurs, and how the observable event occurs;

wherein the plurality of dimensional tables contain grains that represent processes associated with the observable events, each grain being determined before receiving the external data set or the online platform data, each grain being mapped to separate fact tables of the plurality of fact tables;

wherein the at least one processor generates a client profile or a client list based on the data in the fact tables related to observable events and the data in the dimensional tables that identify a context for each observable event; and wherein the at least one processor performs a query of inventory availability and generates, in real time and based on a result of the query, a message that is transmitted through at least one communication channel, wherein at least one of the query or the message is based on data in the client profile or client list.

2. The data integration system of claim 1, wherein at least one fact table comprises a set of numeric values and at least one key that references a row of a dimensional table.

3. The data integration system of claim 2, wherein at least one fact table contains information for a single grain that represents the lowest level of data to be captured by the system and stored in a row of the fact table.

4. The data integration system of claim 3, wherein a one-to-one relationship exists between each key in the fact table and the row of the dimensional table referenced by that key.

5. The data integration system of claim 1, wherein the centralized database stores data according to a dimensional modeling schema, the external database schema being different than the dimensional modeling schema of the centralized database.

6. The data integration system of claim 1, wherein the first importable format and the second importable format are the same.

7. The data integration system of claim 1, wherein the at least one processor is further configured to directly import the received online platform data into the centralized database when the received online platform data is compatible with the centralized database.

8. A computer-implemented method for integrating data from a plurality of sources into a centralized database including fact tables with data related to observable events and dimensional tables with attributes for the data contained in the fact tables, the method comprising the following steps performed by at least one processor:

receiving an external dataset from an external data source, the external data source storing data according to an external database schema;

translating the external dataset into a first importable format compatible with the centralized database, wherein the external dataset is translated using one or more scripts that parse the external dataset, extracting data from the parsed dataset, and generating one or more insert statements to add the extracted data to the centralized database;

importing the extracted data into the centralized database using the one or more insert statements;

receiving online platform data from an online platform comprising a server associated with a website that sends the online platform data for storage in the centralized database;

translating the online platform data into a second importable format compatible with the centralized database; and importing the translated online platform data into the centralized database;

wherein the dimensional tables provide data identifying a context surrounding each observable event, the context including information relating to at least two of the following types:

who is in the observable event, what is the observable event, where the observable event occurs, when the observable event occurs, why the observable event occurs, and how the observable event occurs;

wherein the plurality of dimensional tables contain grains that represent processes associated with the observable events, each grain being determined before receiving the external data set or the online platform data, each grain being mapped to separate fact tables of the plurality of fact tables;

wherein the at least one processor generates a client profile or a client list based on the data in the fact tables related to observable events and the data in the dimensional tables that identify a context for each observable event; and wherein the at least one processor performs a query of inventory availability and generates, in real time and based on a result of the query, a message that is transmitted through at least one communication channel, wherein at least one of the query or the message is based on data in the client profile or client list.

9. The method of claim 8, wherein at least one fact table comprises a set of numeric values and at least one key that references a row of a dimensional table.

10. The method of claim 9, wherein at least one fact table contains information for a single grain that represents the lowest level of data to be captured and stored in a row of the fact table.

11. The method of claim 10, wherein a one-to-one relationship exists between each key in the fact table and the row of the dimensional table referenced by that key.

12. The method of claim 8, wherein the centralized database stores data according to a dimensional modeling schema, the external database schema being different than the dimensional modeling schema of the centralized database.

13. The method of claim 8, wherein the first importable format and the second importable format are the same.

14. The method of claim 8, further comprising:
directly importing the received online platform data into the centralized database when the received online platform data is compatible with the centralized database.

15. The method of claim 1, wherein the at least one processor receives the external data set or the online platform data via an application programming interface (API).

16. The method of claim 1, wherein the result of the query includes information on expiring inventory and the generated message includes a promotion determined based on the expiring inventory.

* * * * *

UNITED STATES PATENT AND TRADEMARK OFFICE
CERTIFICATE OF CORRECTION

Page 1 of 1

PATENT NO. : 12,008,588 B2
APPLICATION NO. : 17/450814
DATED : June 11, 2024
INVENTOR(S) : Candy Kirby Fralick et al.

It is certified that error appears in the above-identified patent and that said Letters Patent is hereby corrected as shown below:

On the Title Page

Item (57), Line 8 of ABSTRACT, "scheme" should read --schema--.

Signed and Sealed this
Twenty-seventh Day of August, 2024

Katherine Kelly Vidal
*Director of the United States Patent and Trademark Office*